(12) United States Patent
Meiller et al.

(10) Patent No.: US 7,160,361 B2
(45) Date of Patent: Jan. 9, 2007

(54) EVAPORATIVE EMISSION TREATMENT DEVICE

(75) Inventors: Thomas C. Meiller, Pittsford, NY (US); Charles H. Covert, Manchester, NY (US); Robert A. Zaso, Rochester, NY (US); Jonathan M. Oemcke, Sterling Heights, MI (US); Christopher S. Tupps, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 356 days.

(21) Appl. No.: 10/729,513

(22) Filed: Dec. 5, 2003

(65) Prior Publication Data

US 2005/0081717 A1    Apr. 21, 2005

Related U.S. Application Data

(63) Continuation-in-part of application No. 10/686,033, filed on Oct. 15, 2003, now abandoned.

(51) Int. Cl.
*B01D 53/04* (2006.01)

(52) U.S. Cl. ............................. 95/143; 96/108; 96/134; 96/147; 96/154; 55/385.1; 55/385.3; 55/486; 55/498; 55/520; 55/528; 55/DIG. 30

(58) Field of Classification Search ............... 55/385.1, 55/385.3, 486, 498, 514, 528, DIG. 13, DIG. 30, 55/487, 520; 96/108, 147, 134–137, 153, 96/154; 123/518–520; 95/143
See application file for complete search history.

(56) References Cited

U.S. PATENT DOCUMENTS

| | | | | |
|---|---|---|---|---|
| 3,505,794 A | * | 4/1970 | Nutter et al. | 55/487 |
| 3,730,158 A | * | 5/1973 | St. Amand | 123/519 |
| 4,181,513 A | * | 1/1980 | Fukuda et al. | 96/153 |
| 4,217,386 A | * | 8/1980 | Arons et al. | 428/198 |
| 4,248,736 A | * | 2/1981 | Fuchigami et al. | 502/402 |
| 4,259,096 A | * | 3/1981 | Nakamura et al. | 96/138 |
| 4,261,717 A | * | 4/1981 | Belore et al. | 96/112 |
| 4,381,929 A | * | 5/1983 | Mizuno et al. | 96/130 |
| 4,386,947 A | * | 6/1983 | Mizuno et al. | 96/137 |
| 4,565,727 A | * | 1/1986 | Giglia et al. | 428/172 |
| 5,063,042 A | * | 11/1991 | Arita et al. | 423/447.4 |
| 5,149,347 A | | 9/1992 | Turner et al. | 55/446 |
| 5,230,960 A | * | 7/1993 | Iizuka | 428/408 |
| 5,254,396 A | * | 10/1993 | Takemura et al. | 442/241 |
| 5,360,669 A | * | 11/1994 | Noland et al. | 428/408 |
| 5,641,344 A | * | 6/1997 | Takahashi et al. | 96/139 |
| 5,820,644 A | * | 10/1998 | Mori et al. | 55/385.3 |
| 5,878,729 A | | 3/1999 | Covert et al. | 123/520 |
| 5,910,637 A | | 6/1999 | Meiller et al. | 96/135 |

(Continued)

FOREIGN PATENT DOCUMENTS

JP         53-53074      *   5/1978

(Continued)

OTHER PUBLICATIONS

U.S. Appl. No. 09/696,988, filed Oct. 26, 2000; "Hydrocarbon Bleed Emission Scrubber With Low Restriction"; 29 pages.

*Primary Examiner*—Jason M. Greene
(74) *Attorney, Agent, or Firm*—Paul L. Marshall (57) ABSTRACT

Disclosed herein an evaporative emission treatment device comprising: a housing; and an adsorption member disposed in the housing, the adsorption member comprising an adsorption component comprising an activated carbon textile made from a novoloid precursor.

16 Claims, 4 Drawing Sheets

U.S. PATENT DOCUMENTS

| | | |
|---|---|---|
| 5,914,294 A | 6/1999 | Park et al. .................. 502/417 |
| 6,183,583 B1* | 2/2001 | Duval et al. ................. 156/148 |
| 6,228,786 B1* | 5/2001 | Olry et al. ................... 442/205 |
| 6,309,451 B1* | 10/2001 | Chen ............................ 96/134 |
| 6,454,834 B1* | 9/2002 | Livingstone et al. ........... 95/11 |
| 6,537,355 B1 | 3/2003 | Scardino et al. ............... 96/147 |
| 6,641,648 B1* | 11/2003 | Walker et al. ................. 96/134 |
| 2002/0061266 A1* | 5/2002 | Maki et al. .................. 422/188 |
| 2002/0088346 A1* | 7/2002 | Baracchi et al. ............... 96/134 |
| 2003/0066427 A1* | 4/2003 | Ishida ......................... 96/135 |
| 2004/0163540 A1* | 8/2004 | Mori et al. .................... 96/134 |
| 2005/0109327 A1* | 5/2005 | Reddy ......................... 123/519 |

FOREIGN PATENT DOCUMENTS

JP      5-245325 A   *   9/1993

* cited by examiner

EVAPORATIVE EMISSION TREATMENT DEVICE

CROSS REFERENCE TO RELATED APPLICATION

The present application is a continuation-in-part application of U.S. patent application Ser. No. 10/686,033, filed Oct. 15, 2003, now abandoned which is hereby incorporated by reference in its entirety.

BACKGROUND

Motor vehicles emit hydrocarbons as a result of the evaporation of fuel. Generally, such evaporative emissions result from the venting of fuel vapors from the fuel tank due to diurnal changes in ambient pressure and/or temperature, the vaporization of fuel by a hot engine and/or exhaust system, and the escape of fuel vapors during refueling of the vehicle. The venting of fuel vapor from the fuel tank due to diurnal pressure and/or temperature changes (i.e., diurnal emissions) is responsible for a majority of evaporative emissions. Diurnal changes in pressure and/or temperature cause air to flow into and out of the fuel tank. Air flowing out of the fuel tank inevitably carries fuel vapor, which is created by the evaporation of fuel into the air contained above the fuel within the fuel tank. If this flow of air is left untreated and is allowed to escape directly into the atmosphere, undesirable emissions occur.

Motor vehicle manufacturers have reduced the level of diurnal emissions through the use of evaporative canisters. Generally, an evaporative canister has a vapor inlet, a purge port, and a vent port. The vapor inlet is fluidly connected by a vapor conduit to the air space in the fuel tank. Diurnal changes in pressure and/or temperature cause air within the fuel tank to flow through the vapor conduit and into the evaporative canister via the vapor inlet. The air carries fuel vapor and/or hydrocarbons. The evaporative canister contains a sorbent material, such as an activated carbon, that strips fuel vapor from the air as it flows through the canister. The treated air then flows out the vent port and into the atmosphere. The purge port is fluidly connected by a valved purge conduit to the combustion air intake of the motor vehicle engine. When the engine is running, the combustion air intake is at sub-atmospheric pressure, and the valve is opened to thereby connect the purge port to the combustion air intake. Fresh air is drawn by the sub-atmospheric pressure through the vent port and into the evaporative canister. The fresh air flows through the sorbent material, out the purge port and into the combustion air inlet. The flow of fresh air through the evaporative canister strips sorbent material of stored fuel vapor and/or hydrocarbons, thereby purging the evaporative canister of hydrocarbons.

Due to incomplete desorption of the hydrocarbons, minute levels of hydrocarbons remain stored in the sorbent material of a purged evaporative canister. Bleed emissions are believed to result from the release of these stored hydrocarbons (i.e., the hydrocarbon heel) from the evaporative canister into the atmosphere. The term "heel" as used herein refers to residual hydrocarbons generally present on a sorbent material when the canister is in a purged or "clean" state. Bleed emissions may occur, for example, during the heating of the fuel tank during a diurnal cycle. The heating of the fuel tank causes air to flow from the fuel tank, through the canister, out the vent port and into the atmosphere. The air carries the hydrocarbon heel out of the canister and into the atmosphere, thereby resulting in the release of bleed emissions.

Additionally, due to increased legislation on emission standards, vehicles are being mandated to have "zero" evaporative emissions due to gasoline vapors. These types of vehicles may be referred to as a Super Ultra Low Emissions Vehicle (SULEV) or as a Practically Zero Emissions Vehicle (PZEV). To meet the new emission standards, an additional adsorbing media, (e.g., a hydrocarbon scrubber) has been added to the air inlet side of the evaporative canister to capture bleed emissions.

Generally, hydrocarbon scrubbers are constructed using activated carbon powder in a ceramic substrate. The hydrocarbon scrubber may be remotely connected to the evaporative canister's air inlet or integrated into the canister. The ceramic substrate honeycomb also employs seals to prevent hydrocarbon flow around the honeycomb and to protect it from breakage due to the brittle nature of the ceramic.

Therefore, what is needed in the art is an improved hydrocarbon scrubber.

SUMMARY

One embodiment of an evaporative emission treatment device comprising: a housing; and an adsorption member disposed in the housing, the adsorption member comprising an adsorption component comprising an activated carbon textile made from a novoloid precursor.

Another embodiment of an evaporative emission treatment device, comprising: a housing disposed around an adsorption member comprising an adsorption component comprising an activated carbon textile having a specific surface area (as measured by the BET method) of greater than or equal to about 1,000 $m^2/g$ and a tensile strength of greater than or equal to about 20 $kg/mm^2$.

One embodiment of a method of making an evaporative emission treatment device, the method comprising: forming an adsorption member comprising an adsorption component comprising an activated carbon textile or paper made from a novoloid precursor; and disposing the adsorption member in a housing.

DRAWINGS

Referring now to the figures, which are exemplary embodiments, and wherein the like elements are numbered alike.

DETAILED DESCRIPTION

Figure 1:
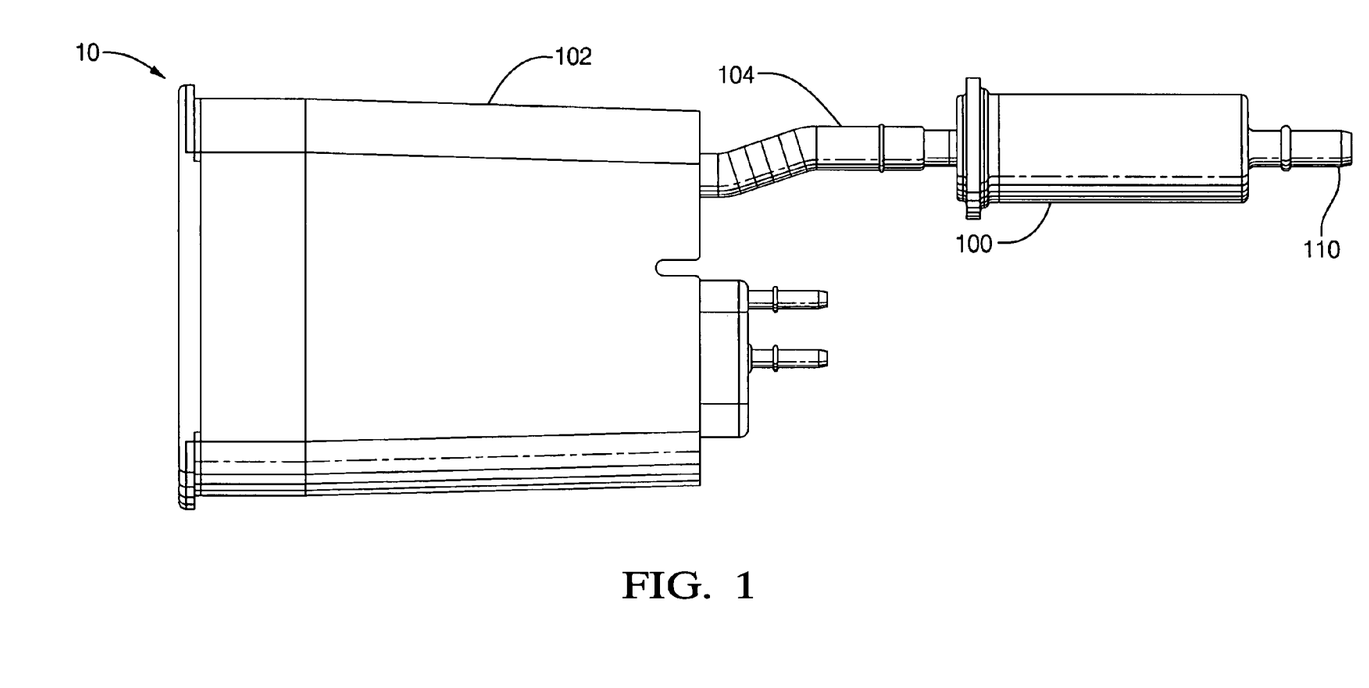
FIG. 1 is an overhead schematic view of an evaporative emissions system having a hydrocarbon scrubber as a separate package.
Figure 2:
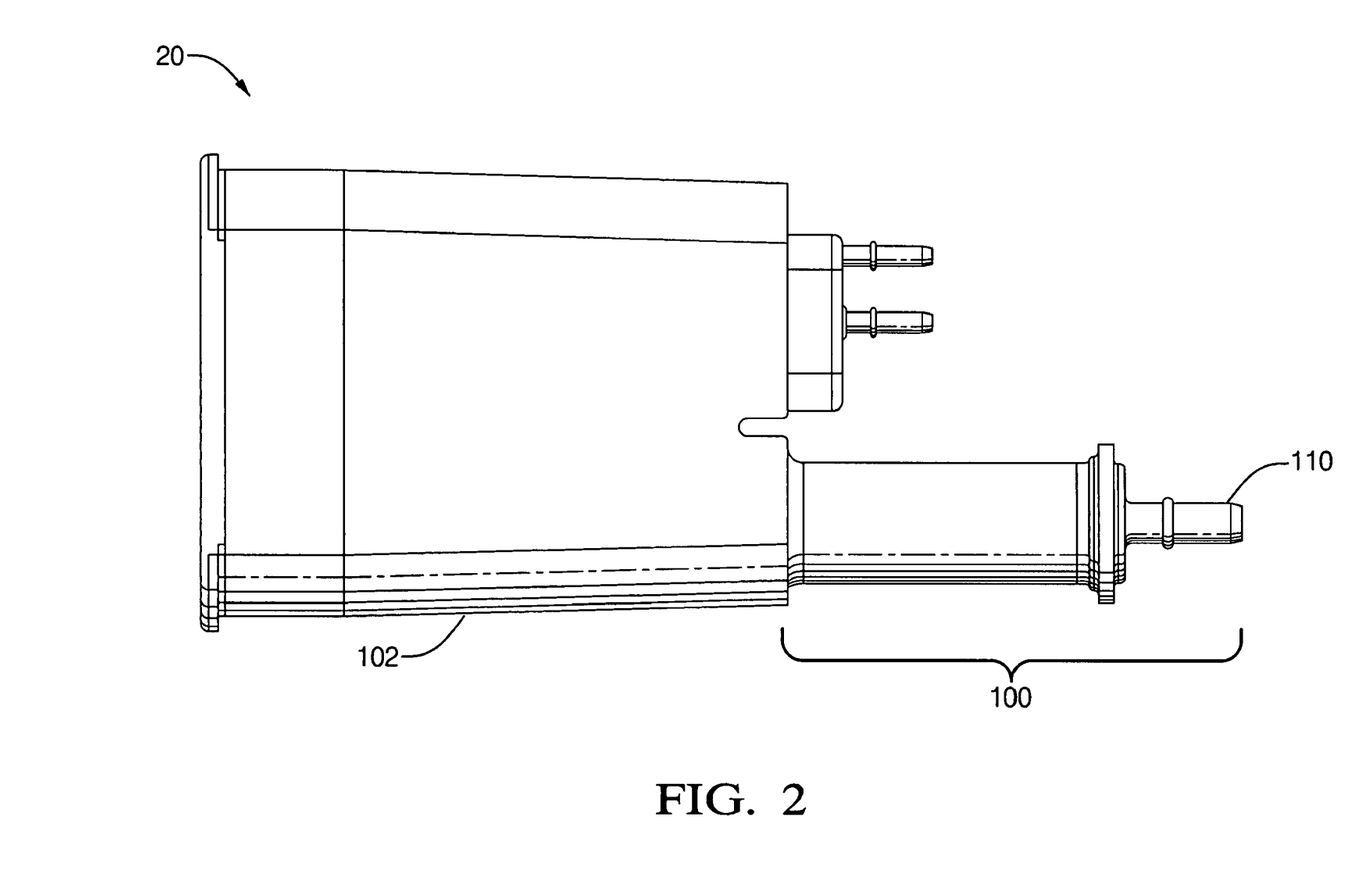
FIG. 2 is an overhead schematic view of an evaporative emissions system having a hydrocarbon scrubber incorporated into a package space of a main evaporative canister.

A hydrocarbon scrubber generally comprises a hydrocarbon adsorption member housed within a canister/shell. The hydrocarbon scrubber is placed in series between a fresh-air side of a main evaporative canister and the atmosphere. As will be discussed in greater detail, the hydrocarbon scrubber may be incorporated into an evaporative emissions system as a separate package as illustrated in FIG. 1. Additionally, for certain applications and where packaging allows, a hydrocarbon scrubber may be incorporated within the package space of the main canister such as illustrated in FIG. 2. This may be achieved by attaching the hydrocarbon scrubber as a subassembly to the exterior of the main evaporative canister, or as a subassembly placed inside the main evaporative canister, or by assembling it inside the main evaporative canister utilizing the same encasement as the main canister.

Referring now to FIG. 1, an evaporative emission system, generally designated 10, is illustrated. System 10 comprises a hydrocarbon scrubber 100, a main evaporative canister 102, and a hose 104 coupled to hydrocarbon scrubber 100 and main evaporative canister 102, wherein hydrocarbon scrubber 100 is in fluid communication with main evaporative canister 102. Hydrocarbon scrubber 100 is placed in series between a fresh-air side of a main evaporative canister 102 and atmosphere. In this embodiment, hydrocarbon scrubber 100 is a separate package. As such, hose 104 provides a conduit for fluid communication between hydrocarbon scrubber 100 and main evaporative canister 102 such that gases pass through the hydrocarbon scrubber 100 before exiting the hydrocarbon scrubber 100 through opening 110 to the atmosphere.

FIG. 2 illustrates an evaporative emissions system, generally designated 20, having hydrocarbon scrubber 100 incorporated into a package space of a main evaporative canister 102. Incorporating hydrocarbon scrubber 100 may be advantageous in that it reduces the number of connections in the system 20. Connections/joints in a system are possible sources of leaks. Thus, a reduction in the number of connections in the system 20 may in turn reduce the possibility of leaks in the system 20.

Figure 3:
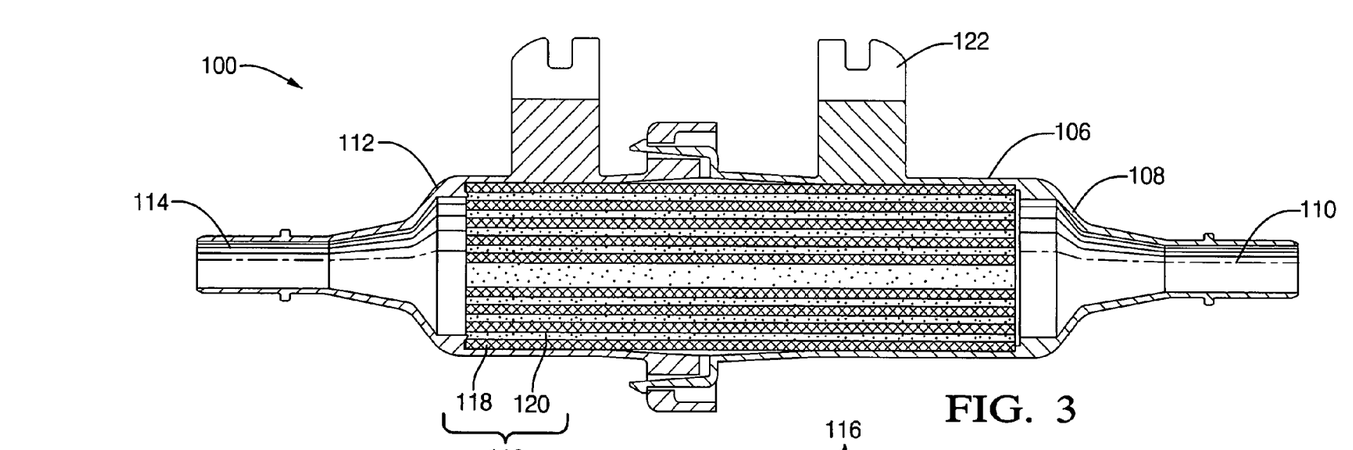
FIG. 3 is a cross-sectional view of an exemplary embodiment of a hydrocarbon scrubber.
Figure 4:
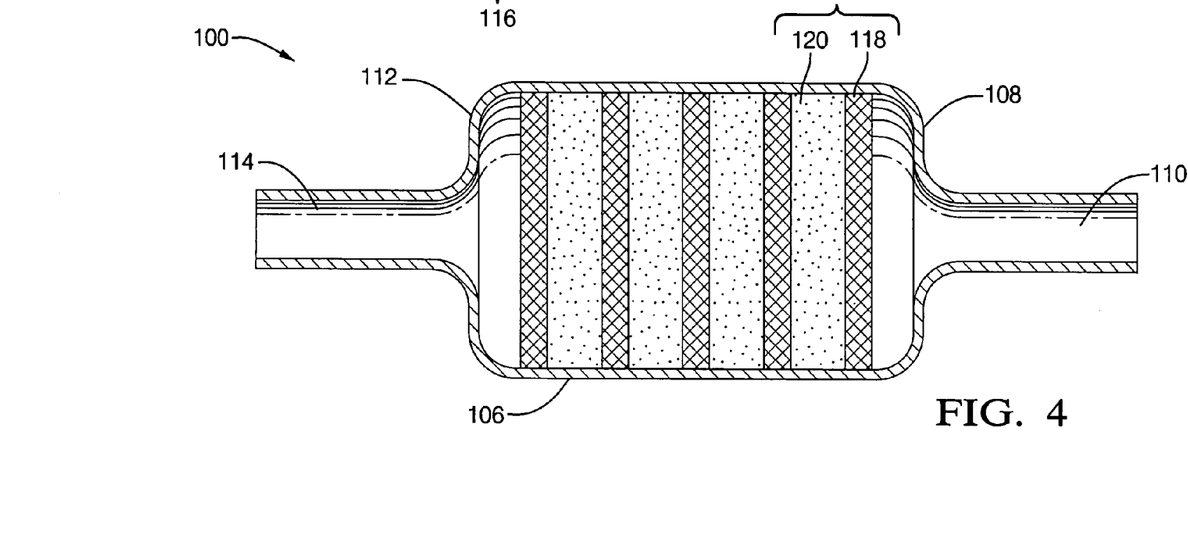
FIG. 4 is a cross-sectional view of another exemplary embodiment of a hydrocarbon scrubber.

FIGS. 3 and 4 illustrate embodiments of a hydrocarbon scrubber 100. Hydrocarbon scrubber 100 comprises a housing 106 having a first tapered end 108 toward a first opening 110, a second tapered end 112 toward a second opening 114; and an adsorption member 116 comprising an adsorption component 118 and a porous component 120. Additionally, housing 106 may further comprise at least one bracket 122, which may be used to attach hydrocarbon scrubber 100 to, for example, an automobile.

Adsorption member 116 preferably has a size and shape designed to substantially match that of housing 106. For example, adsorption member may have a substantially round or polygonal shape (e.g., cylindrical shape, triangular shape, square shape, and the like). Preferably, the housing 106 is tapered inward proximate the ends of the adsorber member 116 to hold the adsorption member 116 in place without the use of seals. Generally, seals are used at the ends of a ceramic substrate to prevent exhaust fluid flow around the substrate and to protect it from breakage due to the brittle nature of the ceramic. As will be discussed in greater detail, adsorption member 116 preferably comprises pliant material (s) (e.g., porous component 120 may be a polyurethane foam and adsorption component 118 may be an activated carbon felt) such that adsorption member 116 may be, for example, press-fitted into the housing 106. Since adsorption member 116 preferably comprises a pliant material compared to hydrocarbon scrubbers employing a ceramic monolith substrate, a number of advantages may be recognized. For example, as noted earlier, the use of seals may be eliminated. In other words, a hydrocarbon scrubber comprising an adsorption member 116 provides a more robust design at a lower material cost compared to hydrocarbon scrubbers employing a ceramic substrate.

FIGS. 3–7 illustrate exemplary embodiments where the adsorption member 116 comprises layers of adsorption component 118 and porous component 120. Although the discussion of these figures relates to embodiments where the adsorption component 118 comprises the outer layer, various other embodiments are realized. For example, porous component 120 may comprise the outer layer of the adsorption member (i.e., the layer on the outermost surface of the adsorber member 116). Alternatively, the adsorption member 116 may be in the form of a felt (woven or non-woven) and used without the porous component 120, since the porous component 120 is generally employed to reduced restriction to fluid flow through adsorption member 118. In other words, adsorption member 116 may comprise any design capable of adsorbing volatile organic compounds (e.g., hydrocarbons found in automotive fuel), while being capable of operating in, for example, an automobile as a hydrocarbon scrubber.

For example, the adsorption member 116 may be employed in an auxiliary canister in an automobile or other vehicle, wherein this member 116 has a configuration that enables a pressure drop across the adsorber member 116 of less than or equal to about 1.5 kPa (kilopascal) at a flow rate of about 60 standard liters per minute (SLPM) with a hydrocarbon emissions to be less than or equal to about 10 mg (milligrams) per day (i.e., a 24 hour period) at temperatures of about 65° F. to about 105° F. (about 19° C. to about 41° C.). Additionally, if the adsorption member 116 is packaged as part of a main evaporative canister, the main evaporative canister including the adsorption member is preferably configured to enable a pressure drop through the canister of less than or equal to about 1.5 kPa at a flow rate of 60 SLPM.

Figure 5:
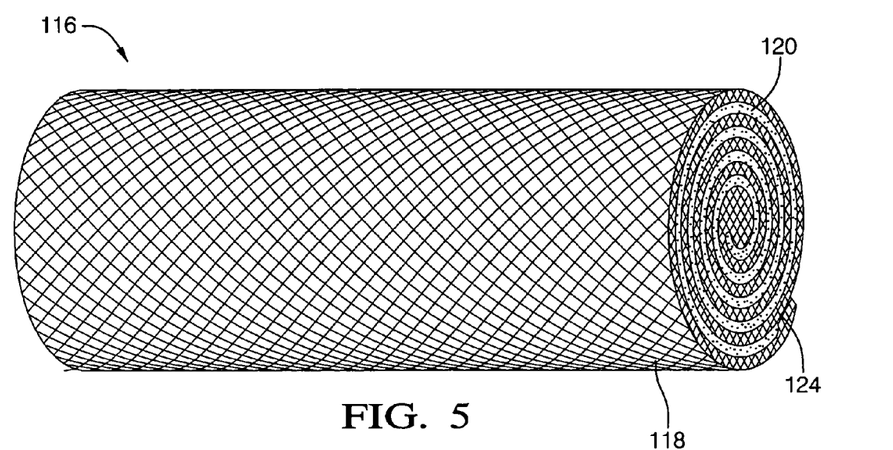
FIG. 5 is an isometric view of an exemplary embodiment of a hydrocarbon adsorption member for a hydrocarbon scrubber.

If the porous component 120 is used as the outer layer, a layer of adsorption component 118 may be disposed at one or both ends of the adsorption member 116 to ensure the fluid passing through adsorption member 116 contacts adsorption component 118 prior to exiting the adsorption member 116. Referring now to FIG. 5, an exemplary embodiment is illustrated, wherein adsorption member 116 is generally cylindrical, and wherein the adsorption member comprises alternating layers of adsorption component 118 and porous component 120. Although the adsorption member 116 can comprise any number of designs as discussed above, adsorption member 116 may preferably have the outer surface comprise adsorption component 118 as illustrated in the exemplary embodiment of FIG. 5. Without being bound by theory, by having an outer surface of adsorption member 116 comprising adsorption component 118, a "quick" fluid flow path along inner surface of housing is eliminated. The term "quick" is used to generically describe fluid flow behavior, i.e., fluid generally flows in the path of least resistance. That is, the fluid flow is forced through the adsorption member 116 such that hydrocarbons can be adsorbed by the adsorption component 118. If porous component 120 were to comprise an outer surface of adsorption member 116 rather than adsorption component 118, all else being equal, a greater flow volume may be achieved in that layer than if an outer surface comprising adsorption component 118 were used, thereby potentially enabling hydrocarbons to pass through the adsorption member 116. Generally, porous component 120 allows for reduced restriction to air flow while adsorption component 118 provides for the adsorption of hydrocarbons. Therefore, adsorption component 118 is preferably disposed on the outer surface of adsorption member 116, adjacent housing 106.

Figure 6:
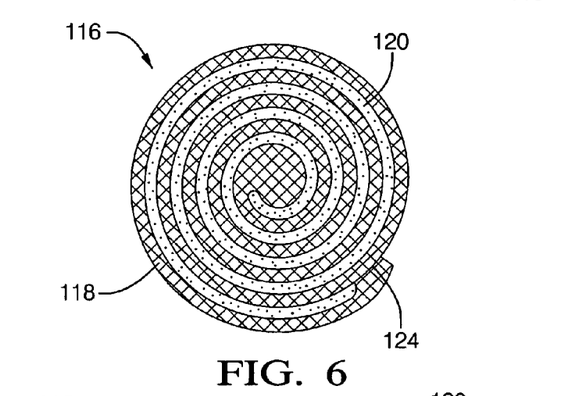
FIG. 6 is a cross-sectional view of a hydrocarbon adsorption member.

Adsorption member 116 can be formed in various fashions. For example, a sheet/layer (hereinafter referred to as "layer") of adsorption component 118 can be disposed adjacent a layer of porous component 120. In an exemplary embodiment, the layer of adsorption component 118 and the layer of porous component 120 can then be rolled up into a substantially cylindrical form, wherein alternating layers of adsorption component 118 and porous component 120 are formed with a portion of the adsorber component 118 preferably disposed on the exterior surface of the adsorber member 116. More particularly, a swirl-like pattern is formed when the sheets/layers are rolled. FIG. 6, which is a cross-sectional view of FIG. 5, more clearly illustrates this configuration. The specific thicknesses of the adsorber component 118 and the porous component 120 are dependent upon the size of the scrubber, desired flow characteristics and pressure drop, and the like. For example, the layer of adsorption component 118 can have a thickness of up to about 4 millimeters (mm) or so, with a thickness of about 1 mm to about 3.5 mm preferred, and a thickness of about 2 mm to about 3 mm more preferred. The layer of porous component 120 can have a thickness of up to about 5 mm or so, with a thickness of about 2 mm to about 4.5 mm and a thickness of about 3 mm to about 4 mm more preferred. The length and width of the sheets/layers may vary with hydrocarbon scrubber design, i.e., a diameter of a resulting adsorption member 116 may be determined by the number of times the sheets/layers are rolled, which in turn is a variable of the width and/or length of the sheets/layers used and the length and inner diameter of the housing 106.

In various embodiments, the rolled sheets of adsorber component 118 and porous component 120, which form the adsorption member 116, can be held together by the forces exerted on the sheets by the housing 106. Alternatively, and/or in addition, an adhesive may be used at a seam 124 of the roll to hold it closed, i.e., to keep the roll from unrolling. Any adhesive capable of bonding the adsorber component 118 and the porous component 120 (i.e., capable of bonding) a felt comprising activated carbon and/or a porous polymeric material, such as a polyurethane foam, while not substantially restricting fluid flow in the adsorption member 116 may be used. Moreover, the adhesive is capable of withstanding a hydrocarbon rich environment. Additionally, in other embodiments, the sheets of adsorber component 118 and porous component 120 may be held together by any fastening means capable for such purposes. For example, tape may be used to hold the sheets together, i.e., the tape may be wrapped around the outer layer of the adsorption member 116. Alternatively, a connector may be used. The connector may comprise any material capable of withstanding a hydrocarbon rich environment. The connector envisioned may be similar to that used to hold tags on new clothes, i.e., a plastic member comprising a substantially I-like shape.

Adsorption component 118 comprises a hydrocarbon adsorbent material (e.g., a material useful in the adsorption and the desorption of hydrocarbons and other volatile components found in motor fuel) formed into and/or coated on a layer, e.g., a felt, paper, or the like. As will be described in greater detail, possible sorbent materials include activated carbon made from a novoloid precursor. The sorbent material can also be mixed with binders, lubricants, glidents, enhancing agents, and the like, to allow for the formation into the desired shape, and the desired permeability and sorptive capacity. The sorbent material may be coated, imbedded, or otherwise formed into, a felt or paper. Preferably, the sorbent material comprises a textile (felt), paper, or the like, which has been directly made from the novoloid precursor. The sorbent material is preferably activated carbon in the form of fibers having a pore density of greater or equal to about 1,000 $m^2/g$ specific surface area as measured by the BET method and a tensile strength of greater or equal to about 20 $kg/mm^2$. Activated carbon fibers comprising a specific surface area of greater or equal to about 1,500 $m^2/g$ and a tensile strength of greater or equal to about 30 $kg/mm^2$ are more preferred.

For example, the activated carbon made from a novoloid precursor may include Kynol™, (commonly available from American Kynol, Inc. of Pleasantville, N.Y.). The term "novoloid" is used to generally describe a manufactured fiber containing at least 85% of a cross-linked novolac (e.g., phenolic resin). Kynol activated carbon materials may be made directly from Kynol™ novoloid fibers and textiles. In other words, the Kynol activated carbon materials may be thought of as activated carbon in textile form (which may be referred to as "felt"). Although these materials may be available as fibers (milled, chopped, roving, or tow), yarns (both spin and continuous), wet- and dry-laid non-wovens, papers, and woven or knitted fabrics, the materials are preferably in the form of paper or knitted fabric like.

Additionally, the novoloid textiles may be transformed into activated carbon by a one-step process combining both carbonization and activation, in an oxygen-free atmosphere containing steam and/or carbon dioxide at temperatures up to about 900° C. Generally, the degree of activation, as measured by the BET (Brunauer, Emmett, Teller) method, is controlled by time rather than temperature, and can approach 3000 $m^2/g$ (meters squared per gram).

Porous component 120 comprises a material that allows for reduced restriction to fluid flow compared to adsorption component 118. Suitable materials include foams, and the like, that are compatible with a rich hydrocarbon environment. For example, a polyurethane foam (such as reticulated polyurethane foam), needled polyester, and the like can be used. The material has a flexibility sufficient to be rolled, but stiff enough that it does not collapse when rolled. For example, the foam may be about 20 ppi foam to about 60 ppi foam, within this range 30 ppi foam to about 45 ppi foam is preferred.

Figure 7:
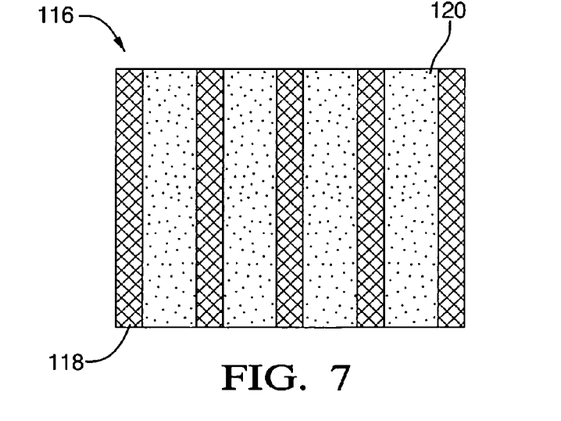
FIG. 7 is a lengthwise cross-sectional view of another exemplary embodiment of a hydrocarbon adsorption member for a hydrocarbon scrubber.

FIG. 7 illustrates a lengthwise cross-sectional view of another exemplary embodiment of adsorption member 116. In this embodiment, adsorption member 116 comprises alternating strips, i.e., layers of adsorption component 118 and layers of porous component 120. Adsorption component 118 preferably comprises a first outer surface and a second outer surface of adsorption member 116. In other words, adsorption component 118 comprises the surfaces of adsorption member 116 that relate to first and second opening of housing 106, which encases adsorption member 116. Generally, this adsorption member 116 embodiment comprises a larger cross sectional area compared to that of the rolled adsorption member 116 illustrated in FIG. 6, since the fluid serially flows through each adsorption component 118 layer. In contrast, the adsorption component 118 and porous component 120 of a rolled adsorption member 116 comprise parallel fluid flow paths.

In making a "stacked" type of layer adsorption member 116, adsorption component 118 and porous component are alternately stacked (e.g., piled, placed, and/or the like) on each other, wherein adsorption component 118 preferably comprises the bottom/first surface and the top/last surface to ensure the desired level of hydrocarbon removal. Adsorption member 116 may be cut-out from the stacked sheets/layers based on design specifications such as shape and size. Similar to the rolled embodiment illustrated in for example FIG. 6, the "stacked embodiment" may use adhesives or fastening means similar to those described for the rolled embodiment.

As discussed above, adsorption member 116 is housed/encased in housing 106. Housing 106 may comprise a non-ferrous or ferrous material capable of operating in an evaporative emissions environment having the following characteristics: (1) capable of operating at temperatures up to about 125° C.; and (2) capable of withstanding exposure to hydrocarbons, carbon dioxide, and/or water. Possible non-ferrous materials can include plastics, composite materials, and combinations comprising at least foregoing non-ferrous materials, and the like. Possible ferrous materials may include carbon steels, alloys, and combinations comprising at least one of the foregoing ferrous materials.

Housing 106 may comprise additional features attached to housing 106 to facilitate mounting the evaporative emission treatment device in any orientation to an evaporative emission treatment system, and the like, within a vehicle. For example, possible mounting members may include mounting tabs (e.g., bracket 122), dovetail mounting tabs, "belly band guides", and combinations comprising at least one of the foregoing mounting members that may be mounted by snapping, slidingly engaging, screwing, and combinations comprising at least one of the foregoing methods, in any orientation to a vehicle's system.

In certain situations, several additional embodiments of hydrocarbon scrubber 100 are envisioned. For example, a vent solenoid, which may be used by a vehicle as part of its evaporative emissions diagnostic, may be incorporated in the same package as hydrocarbon scrubber. An air filter may be incorporated into hydrocarbon scrubber 100 package or attached to the fresh-air-side of hydrocarbon scrubber. Moreover, to avoid contamination of hydrocarbon scrubber from water, an air/water separator may be used in series with hydrocarbon scrubber on the fresh-air-side. These embodiments may be packaged separately or together with hydrocarbon scrubber 100.

Additionally, to improve a purge performance of hydrocarbon scrubber 100, a heating element or elements may be incorporated on the fresh-air-side 110 of hydrocarbon scrubber 100, and energized while purging. The resultant heating of the purge air will aid in desorption of hydrocarbons from adsorption member 116. In short, the improved purge performance associated with heating the purged air may provide greater sorbent efficiency during hydrocarbon loading. The addition of a heat source may allow for use of a sorbent material that is highly micro-porous (such as that used in gas masks). However, highly micro-porous sorbents (e.g., coconut based activated carbons) have high retentivity, but poor desorptive characteristics when compared to, for example, standard automotive carbons.

The hydrocarbon scrubber of this disclosure may be used in other areas of application other than the automotive industry. Essentially, the hydrocarbon scrubber may be adapted or used for any evaporative emissions system. Additionally, the activated carbon fibers made from a novoloid precursor may be incorporated into standard substrate designs, i.e., the activated carbon made from a novoloid precursor may be incorporated in designs using a ceramic monolith. More particularly, the activated carbon made from a novoloid may be added to a ceramic forming material during extrusion of the monolith.

EXAMPLES

The restriction (pressure drop) for various hydrocarbon scrubber designs was measured at a flow rate of 60 standard liters per minute (SLPM). This data is summarized below in Table 1. The first four examples illustrate a configuration where the scrubber is incorporated into a main evaporative canister. This package design is similar to that shown in FIG. 2. The last two examples illustrate a configuration where the scrubber is a stand-alone device, which is similar to the evaporative emission device 100 shown in FIG. 1. The term "Kynol" as used in this section refers to a felt adsorption material comprising activated carbon made from a novoloid precursor, Kynol™.

TABLE 1

| Description | Scrubber Size | Kynol Material Size | Restriction at 60 SLPM |
| --- | --- | --- | --- |
| Canister with integral rolled Kynol Scrubber | 100 mm × 41 mm diameter | 100 mm × 355 mm (unrolled) | 0.83 kPa |
| Canister with integral rolled Kynol Scrubber | 50 mm × 41 mm diameter | 50 mm × 355 mm (unrolled) | 1.33 kPa |
| Canister with integral rolled Kynol Scrubber | 50 mm × 41 mm diameter | 50 mm × 260 mm (unrolled) | 1.23 kPa |
| Stand-alone layered Kynol Scrubber | 100 mm × 60 mm diameter | 6 layers, 60 mm diameter | 0.33 kPa |
| Stand-alone rolled Kynol Scrubber | 100 mm × 43 mm diameter | 100 mm × 330 mm (unrolled) | 0.38 kPa |

Advantageously, a hydrocarbon scrubber of the instant disclosure comprising an adsorption member as described offers a number of advantageous over, for example, a hydrocarbon scrubber having a monolith comprising a ceramic substrate. For example, an adsorption member having an adsorption component comprising an adsorbent felt or paper material (e.g., carbon fiber) may offer cost savings compared to a monolith comprising a ceramic substrate. Moreover, a monolith comprising a ceramic substrate is generally fragile, whereas an adsorption member of this disclosure is more durable. Additionally, since a ceramic substrate is fragile, hydrocarbon scrubbers having this component generally have seals to protect the ceramic substrate from damage, which may add additional costs to a hydrocarbon scrubber. Seals are not used in a hydrocarbon scrubber of this disclosure.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An evaporative emission treatment device comprising:
   a housing; and
   an adsorption member disposed in the housing, the adsorption member comprising an adsorption layer comprising an activated carbon textile made from a novoloid precursor and a porous layer adjacent the adsorption layer, said adsorption member being cylindrical and having a cross-section such that the adsorption layer and the porous layer are arranged in a helical geometry.

2. The evaporative emission treatment device of claim 1, wherein the adsorption layer and the porous layer form alternating layers along a diameter of the cross-section.

3. The evaporative emission treatment device of claim 2, wherein the adsorption layer forms an outer layer of the adsorption member proximate to the housing.

4. The evaporative emission treatment device of claim 2, wherein the porous layer forms an outer layer of the adsorption member proximate to the housing.

5. The evaporative emissions treatment device of claim 2, wherein the porous layer comprises a reticulated polyurethane foam.

6. The evaporative emissions treatment device of claim 2, wherein the adsorption layer comprises a thickness of less than or equal to about 4 mm.

7. The evaporative emissions treatment device of claim 2, wherein the porous layer comprises a thickness of less than or equal to about 5 mm.

8. An evaporative emission treatment device, comprising:
   a housing disposed around an adsorption member comprising an adsorption layer comprising an activated carbon textile having a specific surface area (as measured by the BET method) of greater than or equal to about 1,000 $m^2/g$ and a tensile strength of greater than or equal to about 20 $kg/mm^2$, said adsorption member further comprising a porous layer adjacent the adsorption layer, said adsorption member being cylindrical and having a cross-section such that the adsorption layer and the porous layer are arranged in a helical geometry.

9. The evaporative emission treatment device of claim 8, wherein the adsorption member has a pressure drop across the adsorption member of less than or equal to about 1.5 kPa at a flow rate of 60 SLPM and a hydrocarbon emission of less than or equal to about 10 mg during a 24-hour period.

10. The evaporative emission treatment device of claim 8, wherein the adsorption member comprises alternating layers of the adsorption component and a porous component along a diameter of the cross-section.

11. The evaporative emission treatment device of claim 8, wherein the adsorption layer forms an outer layer of the adsorption member proximate to the housing.

12. The evaporative emission treatment device of claim 8, wherein the porous layer forms an outer layer of the adsorption member proximate to the housing.

13. The evaporative emissions treatment device of claim 8, wherein the porous layer comprises a reticulated polyurethane foam.

14. The evaporative emissions treatment device of claim 8, wherein the adsorption layer comprises a thickness of less than or equal to about 4 mm.

15. The evaporative emissions treatment device of claim 8, wherein the porous layer comprises a thickness of less than or equal to about 5 mm.

16. A method of making an evaporative emission treatment device, the method comprising:
   forming an adsorption layer comprising an activated carbon textile made from a novoloid precursor;
   disposing a porous layer adjacent the adsorption layer;
   rolling the adsorption layer and the porous layer to form a cylindrical adsorption member having a cross-section such that the adsorption layer and the porous layer are arranged in a helical geometry; and
   disposing the adsorption member in a housing.

* * * * *